United States Patent [19]

Michels

[11] Patent Number: 4,855,089
[45] Date of Patent: Aug. 8, 1989

[54] DISTRIBUTOR FOR DISTRIBUTING LIQUID IN AN EXCHANGE COLUMN

[75] Inventor: Christoph Michels, Wurzburg Lengfeld, Fed. Rep. of Germany

[73] Assignee: Sulzer Brothers Limited, Winterthur, Switzerland

[21] Appl. No.: 163,371

[22] Filed: Mar. 2, 1988

[30] Foreign Application Priority Data

Mar. 2, 1987 [CH] Switzerland ............... 00782/87

[51] Int. Cl.⁴ .............................................. B01F 3/04
[52] U.S. Cl. ...................................... 261/97; 239/542
[58] Field of Search ......................... 261/97; 239/524

[56] References Cited

U.S. PATENT DOCUMENTS

| | | | |
|---|---|---|---|
| 75,238 | 3/1968 | Baldwin | 239/524 |
| 899,899 | 9/1908 | Petersen | 261/97 |
| 2,295,088 | 9/1942 | Kleucker | 239/524 |
| 3,290,025 | 12/1966 | Engalitcheff, Jr. | 261/97 |
| 4,159,291 | 6/1979 | Bruckert et al. | 261/97 |
| 4,476,069 | 10/1984 | Harper et al. | 261/97 |
| 4,597,916 | 7/1986 | Chen | 261/112.2 |
| 4,729,857 | 3/1988 | Lee et al. | 261/97 |

FOREIGN PATENT DOCUMENTS

| | | | |
|---|---|---|---|
| 2945103 | 5/1981 | Fed. Rep. of Germany | 261/97 |
| 2752391 | 3/1985 | Fed. Rep. of Germany | . |
| 398503 | 3/1966 | Switzerland | . |
| 673322 | 7/1979 | U.S.S.R. | 239/524 |

Primary Examiner—Tim Miles
Attorney, Agent, or Firm—Kenyon & Kenyon

[57] ABSTRACT

The distributor has a plurality of distribution channels with outlet openings in the lower region for expelling streams of liquid against opposed impact walls in order to form descending liquid films on the impact walls. The impact walls are spaced from the side walls of the channels by a distance greater than the thickness of the liquid film formed on the impact walls. The kinetic energy of the liquid streams is relied upon to form the liquid film in parabolic-like shapes. Screening walls may also be disposed in opposition to the impact walls to preclude the entrainment of liquid in the rising vapor phase.

15 Claims, 10 Drawing Sheets

Fig.3b
Fig.3c
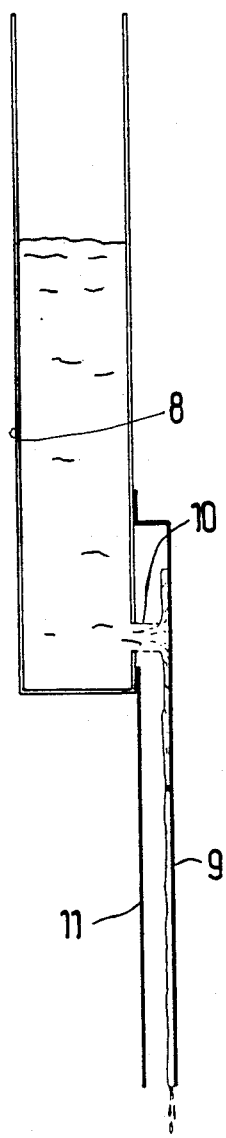
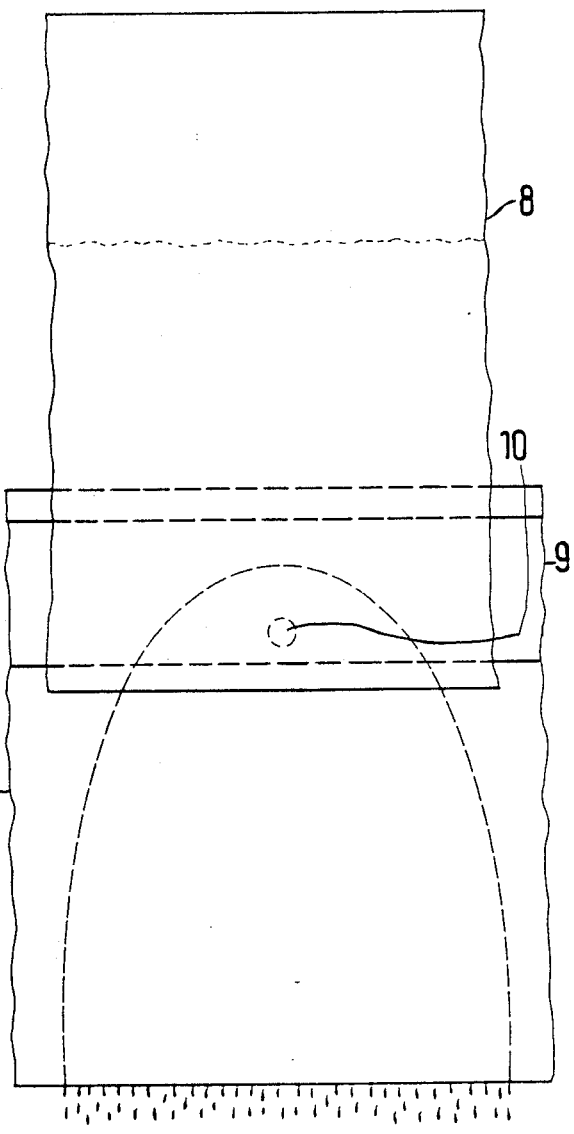

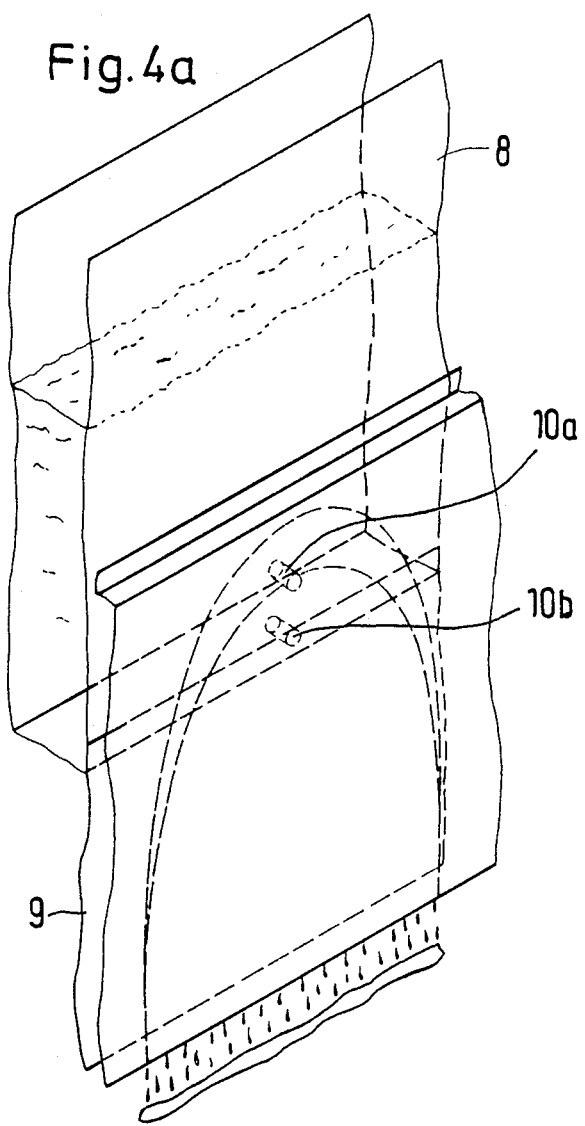

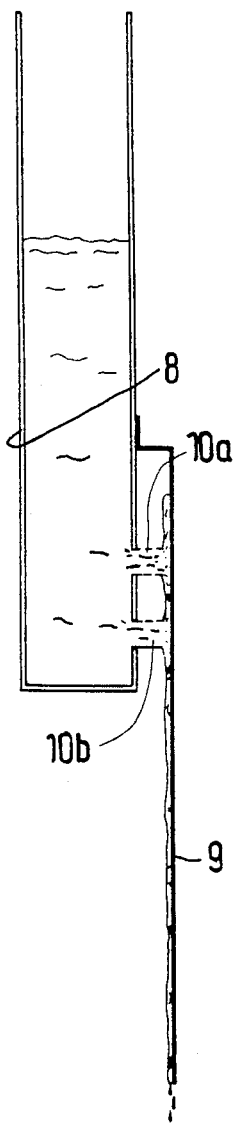
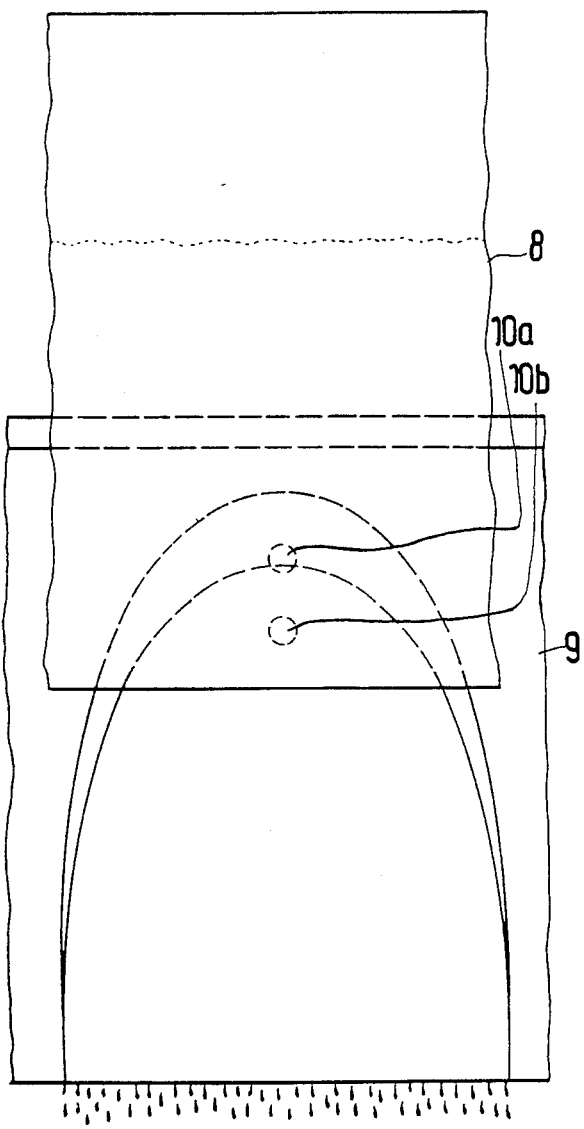
Fig. 4b
Fig. 4c

Fig. 5b
Fig. 5c
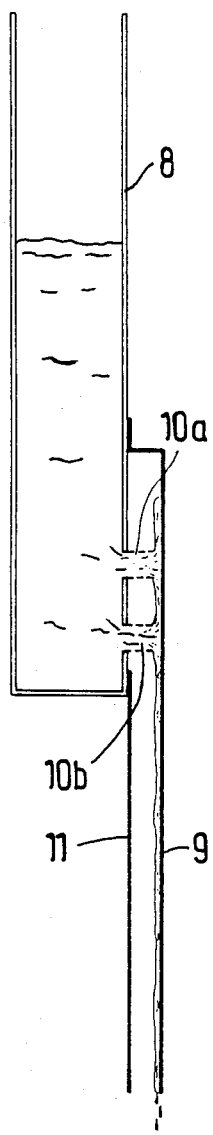
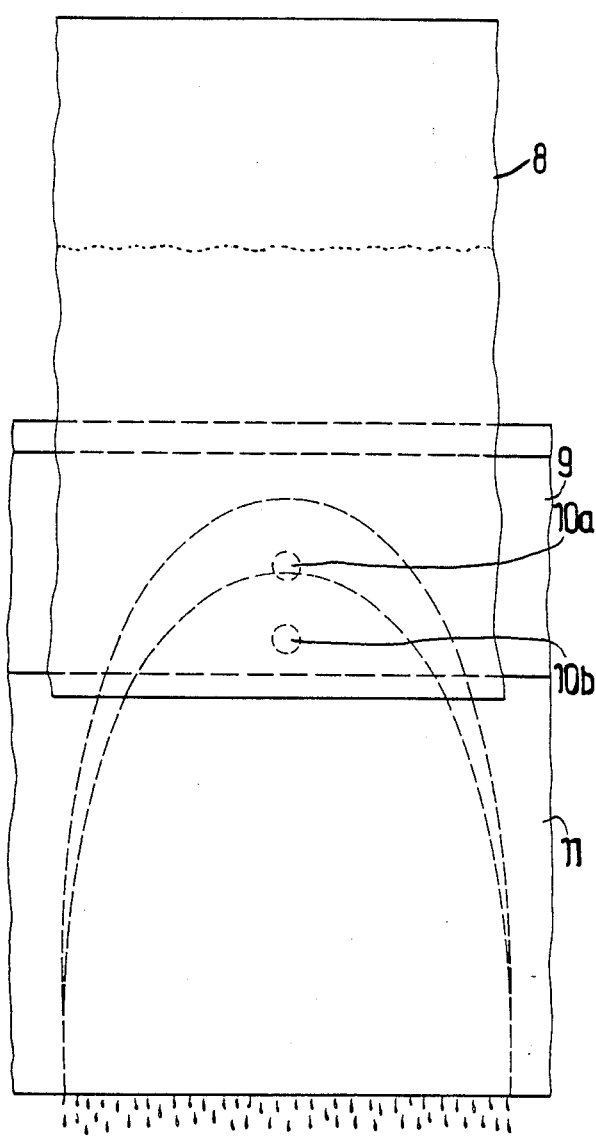

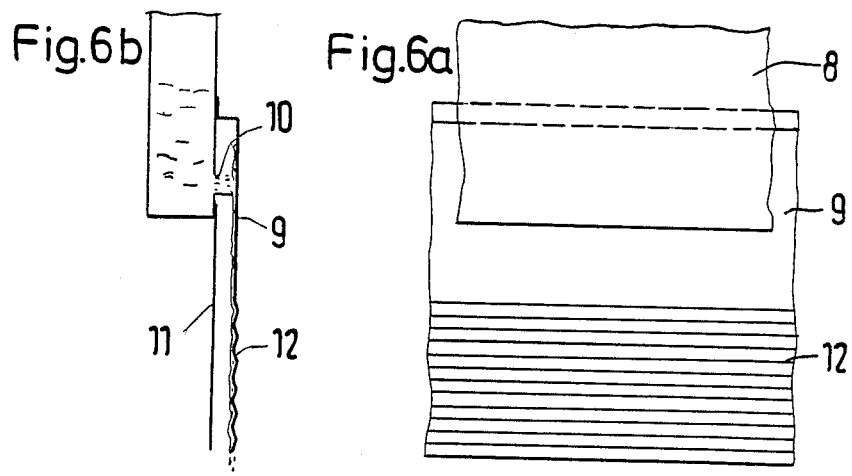
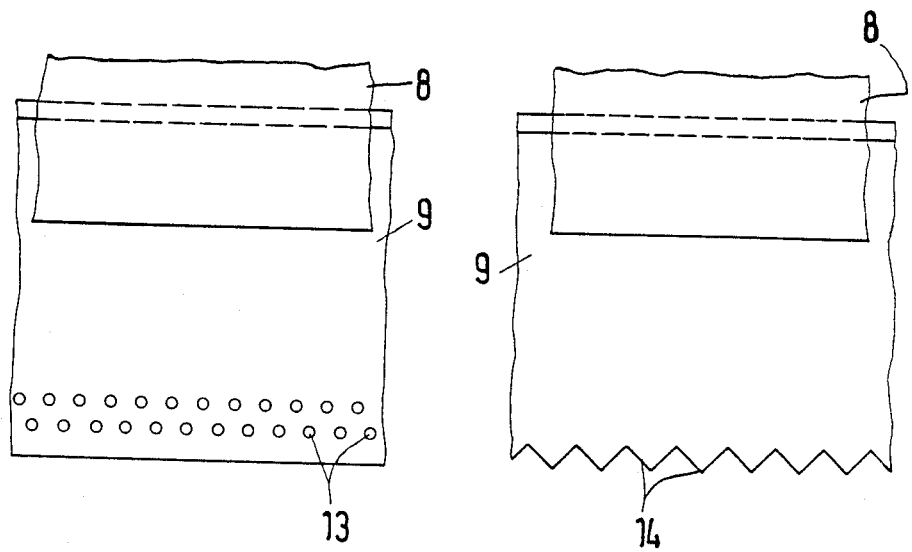

DISTRIBUTOR FOR DISTRIBUTING LIQUID IN AN EXCHANGE COLUMN

This invention relates to a distributor for distributing liquid in an exchange column such as mass exchange columns and heat exchange columns.

Heretofore, various types of distributors have been known for the distribution of liquids over the cross-section of an exchange column. Such columns generally have exchange packings therein which are of various shapes, sizes and constructions. For example, the packings may consist of ordered packings, for example, of corrugated, lamella-like elements. In other cases, the exchange packing may consist of irregular pourings of fillers, for example, Raschig rings or a combination of vertical channels arranged in parallel relationship with the spaces therebetween filled with fillers where the individual channels have a large diameter or built as so-called film columns where the diameter of the channels is small.

Such columns have been used, for example, for distillation, rectification, extraction, absorption, and isolation of isotopic elements from a substance based on chemical exchange reactions as well as heat exchange between a liquid and a vapor gaseous medium.

Of the known types of liquid distributors, a few known and frequently used types are discussed below.

In one case, the liquid distributors have been constructed with hole or sieve bottoms with a large number of uniformly arranged perforations or perforated nozzles with overflow systems. This construction, however, has a disadvantage in that the construction covers a large cross section of the column in order to achieve a somewhat uniform liquid distribution over the entire column cross section. Further, despite the provision of vapor chimneys and a possible gap between the distributor and a column wall, the cross section for the passage of vapor is greatly narrowed. This, in turn, leads to a large pressure drop. In order to improve on this, lateral tubules have been proposed; however, while the measure increases the uniformity of the liquid distribution, the rather large pressure drop of the vapor is only decreased to a small degree.

A further known construction is in the form of a so-called box or tubular distributor (pipe manifold) with perforations on the underside for the flow of liquid. However, these distributors have a substantial disadvantage in that the liquid may only flow out below the boxes or pipes. As a result, there is a concomitant demand for a large number of boxes or pipes for a fine distribution of the liquid to be possible. This, on the one hand, effects a large pressure drop on the vapor side, and, on the other hand, in terms of construction is very elaborate.

It has also been known that with the first mentioned construction, the separation effect, and, in the last mentioned structure, the heat transfer effect, depend significantly on a uniform and fine distribution of the liquid on the surface of an exchange packing.

German Pat. No. 2752391 describes a distribution arrangement consisting of U-shaped parallel channels which are open at the top and which have V-shaped slits forming outlet openings at the upper edge of the upright walls of the channels for the liquid. In addition, continuous guide walls are located in opposition to the liquid outlet openings at a close distance. The gap between the channel walls and the guide walls is of such a size that the liquid expelled from the U-shaped channels fills the gap. The liquid is quasi-"squeezed" in the gap so that a broad liquid stream originates. Further, the guide walls are described as projecting beyond the side walls of the channels and as being provided with overflow slits so that, given high pressure, the liquid accumulating in the gap can flow off through these slits. In order to achieve flow-off, even of small liquid quantities in this way, a wire mesh or expanded mesh is arranged so that, due to the occurring capillary forces in connection with the dynamic pressure building up at the outlet openings immediately behind them, transverse distribution of the liquid takes place.

However, the described distributor has a number of significant disadvantages. First, the distance of the guide walls from the walls of the channel must be precisely regulated according to the liquid load and a change of operating conditions requires interruption of operation. Second, since the gap width is smaller than the outlet openings by one order of magnitude and the gaps, in addition, may even contain wire mesh or expanded mesh, the danger of contamination, and, consequently the danger of stopping-up, is great. Moreover, the known construction is essentially an overflow system which makes the construction extremely sensitive to being placed in a slanted position.

Still further, the liquid penetrating into the gap has a relatively low penetration rate since the accumulation height of the outlet openings in the channel walls is relatively low and the overflow rate is a function of this accumulation height.

Accordingly, it is an object of the invention to provide for a uniform distribution of a liquid in an exchange column.

It is another object of the invention to provide for a high distribution quality which is largely independent of the liquid load.

It is another object of the invention to provide a simplified construction of distributor for reliably distributing liquid in a uniform manner into an exchange column.

Briefly, the invention provides a liquid distributor for an exchange column which includes a plurality of distribution channels for receiving a liquid each of which has a pair of vertically disposed side walls, a plurality of orifices or openings extending laterally from a lower region of at least one side wall of a distribution channel for expelling streams of liquid laterally from the side wall and a plurality of guide walls each of which is spaced from a side wall of a respective distribution channel for impacting of a liquid stream thereon and formation of a downwardly flowing film on the guide wall. In accordance with the invention, each guide wall is spaced from a respective side wall a distance greater than the thickness of the film of liquid thereon.

In this construction, the kinetic energy of an expelled liquid jet is utilized for spreading the liquid on the guide wall which, in this case, functions as an impact wall.

Each guide or impact wall of the distributor may be secured along an upper edge to a respective side wall of a channel in order to prevent an upward flow of vapor therebetween, particularly, with entrained liquid. In addition, a screening wall may be connected to the side wall of a channel in spaced parallel relation to an opposed guide or impact wall. This also serves to prevent entrainment of the liquid by an "ascending vapor particularly at high vapor rates.

These and other objects and advantages of the invention will become more apparent from the following detailed description taken in conjunction with the accompanying drawings wherein:

FIG. 2b illustrates a cross sectional view of the part of the distributor illustrated in FIG. 2a;

FIG. 2c illustrates a side view of the distributor part illustrated in FIG. 2a;

FIG. 3b illustrates an end view of the distributor part illustrated in FIG. 3a;

FIG. 3c illustrates a side view of the distributor part illustrated in FIG. 3a;

FIG. 4a illustrates a part-perspective view of a modified distributor employing vertical pairs of outlet openings in accordance with the invention;

FIG. 4b illustrates an end view of the distributor part illustrated in FIG. 4a;

FIG. 4c illustrates a side view of the distributor part illustrated in FIG. 4a;

FIG. 5b illustrates an end view of the distributor part of FIG. 5a;

FIG. 5c illustrates a side view of the distributor part of FIG. 5a;

FIG. 6a illustrates a side view of a modified distributor having a guide wall with a corrugated lower end in accordance with the invention;

FIG. 6b illustrates an end view of the distributor part of FIG. 6a;

FIG. 7 illustrates a side view of a modified guide wall having a plurality of openings in the lower end in accordance with the invention; and FIG. 8 illustrates a side view of a guide wall having a serrated lower edge in accordance with the invention.

Figure 1:
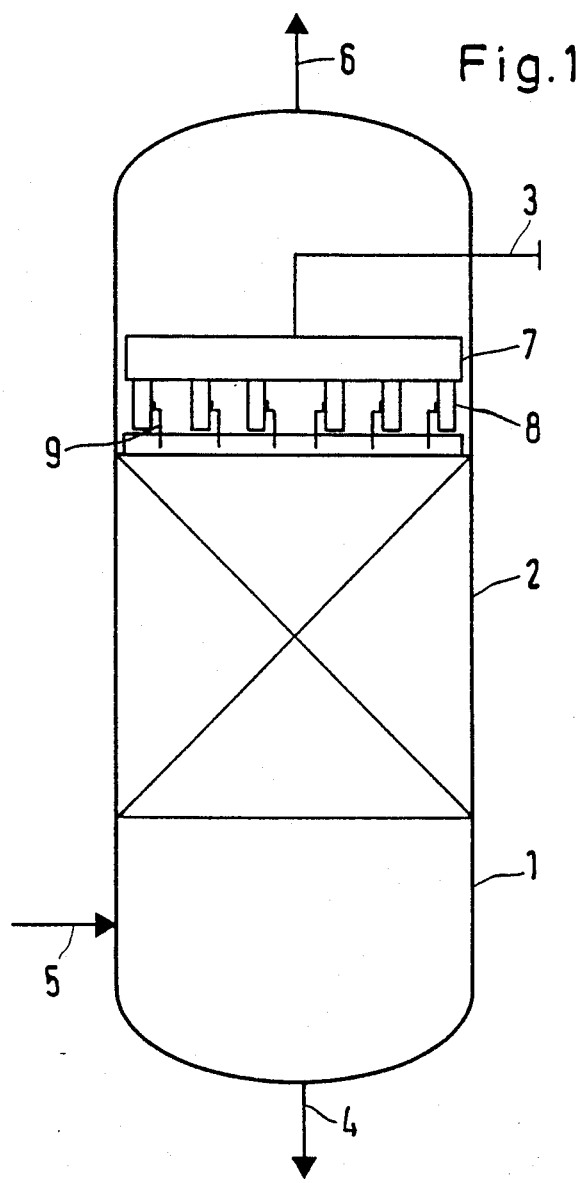
FIG. 1 illustrates a schematic view of an exchange column employing a distributor in accordance with the invention.

Referring to FIG. 1, the exchange column is in the form of a rectification column 1 having mass exchange packings 2 with an ordered structure, such as described in Swiss Patent No. 398,503, mounted therein. In addition, liquid inflow and outflow ducts as well as gas or vapor inflow and outflow ducts 3, 6 are connected to the column 1 in known manner. As indicated, the liquid inflow duct 3 is connected to a distributor for feeding liquid thereto. This distributor includes a main channel 7 which is opened at the top which serves to feed the liquid under gravity to a plurality of parallel distribution channels 8 which are of U-shape and are opened at the top. In addition, a guide wall 9 is secured to a side wall of each distribution channel 8 for purposes as described below.

Figure 2A:
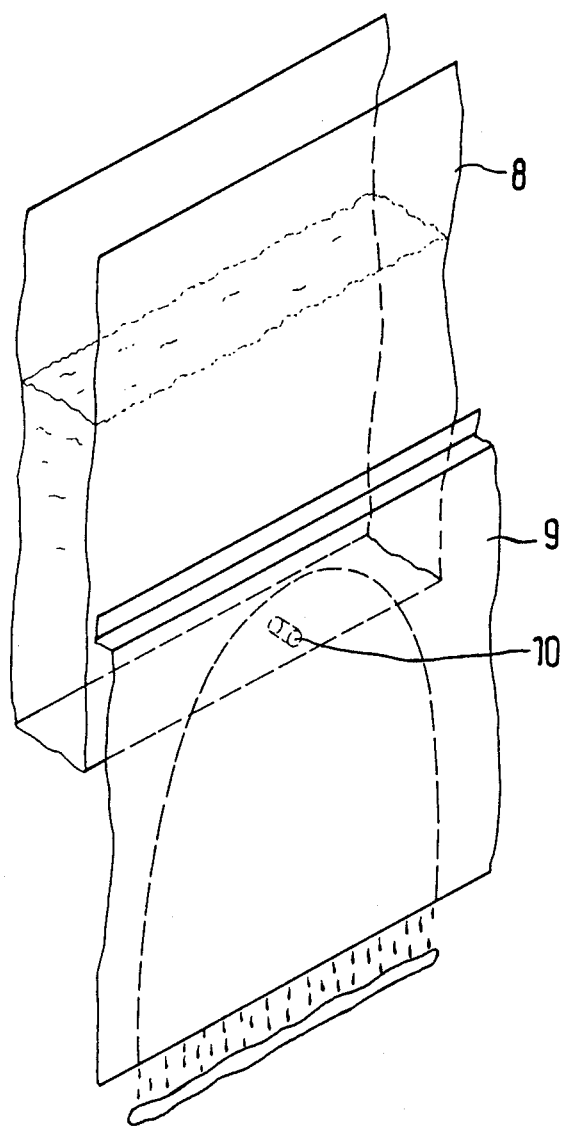
FIG. 2a illustrates a part-perspective view of a distributor constructed in accordance with the invention.
Figure 2B:
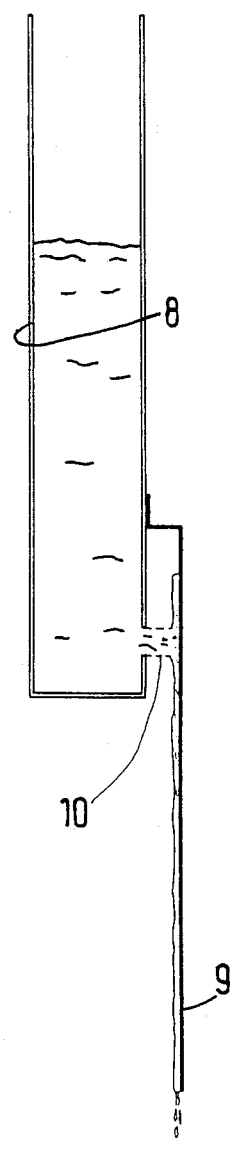
Figure 2C:
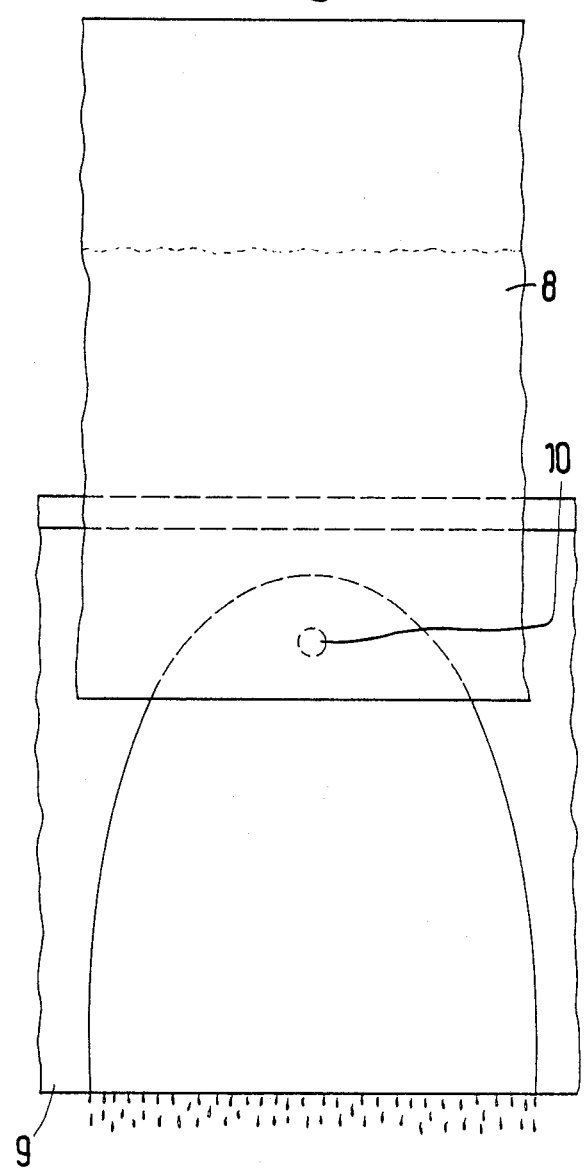

Referring to FIGS. 2a, 2b, and 2c, wherein like reference characters indicate like parts as above, each distribution channel 8 which may also be in the form of a tube has a guide or impact wall 9 located in a lower region. In addition, each impact wall 9 is secured along an upper edge, for example by bending in of the impact wall 9, to the side wall of a channel 8 to prevent an upward flow of vapor therebetween. This has the advantage that no liquid can be entrained upwardly by the rising vapor or gas in the column. As illustrated, each impact wall 9 has a flat uninterrupted portion which extends downwardly below the lower edge of the associated distribution channel 8.

In principle, the gap formed by the wall of the channel 8 and the impact wall 9 may be closed at the ends by suitable walls (not shown) in order to prevent entrainment of the liquid in the upward flow of vapor.

As illustrated, a plurality of openings 10 are disposed in the lower region of at least one side wall of the distribution channel 8 for expelling streams of liquid laterally form the wall against the opposed impact wall 9. For purposes of simplicity, only one such opening in the form of a circular orifice which faces laterally from the side wall of the channel 8 is illustrated.

Each liquid stream flows from the opening 10 at a relatively high rate and strikes the impact wall 9 for distribution thereon into a parabolic shape to form a downwardly flowing film thereon. In this respect, the kinetic energy of the expelled liquid stream is used for distribution. As illustrated in FIG. 2b, the impact wall 9 is spaced from the respective side wall of the channel 8 by a distance greater than the thickness of the film of liquid on the impact wall 9. In addition, each opening 10 has a transverse dimension less than the distance between the impact wall 9 and the respective side wall of the channel 8. For example, the diameter of the orifice is less than the distance between the impact wall 9 and the side wall of the channel 8.

Although each channel 8 is shown with a single impact wall, impact walls may be arranged on both sides of the channel 8.

Figure 3A:
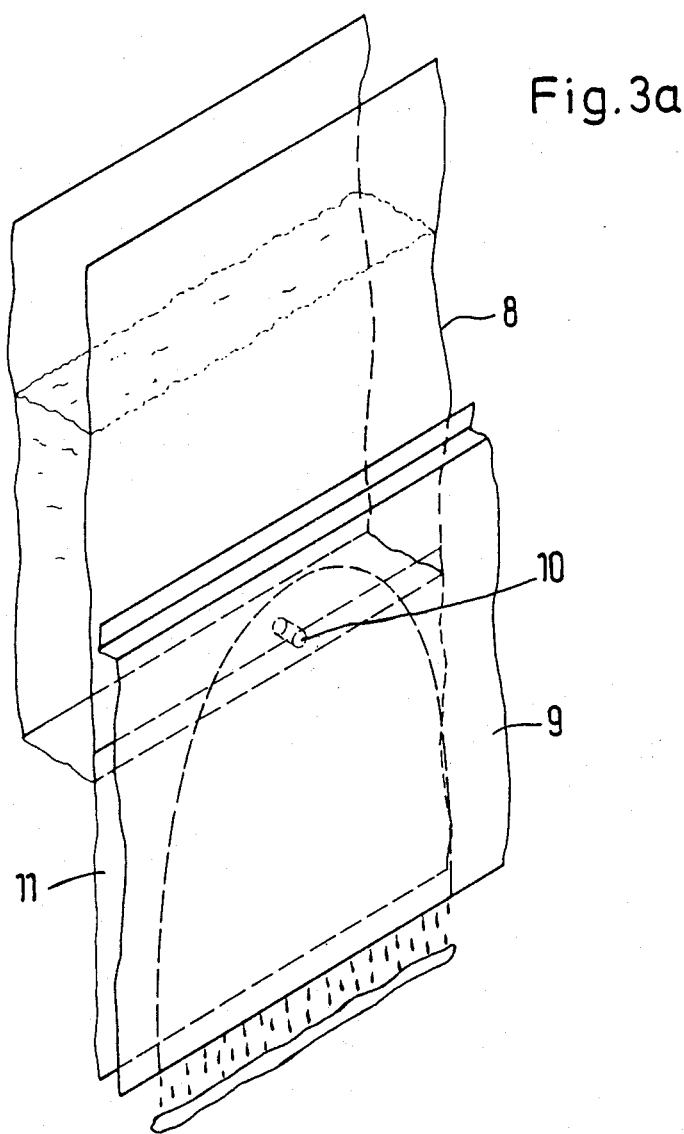
FIG. 3a illustrates a part-perspective view of a modified distributor employing a screening wall in accordance with the invention.

Referring to FIGS. 3a, 3b and 3c, wherein like reference characters indicate like parts as above, a screening wall 11 may be connected at a lower end of a side wall of a distribution channel 8 in depending relation and in parallel relative to an opposed impact wall 9. This construction provides an even better prevention of liquid entrainment by the rising vapor, especially at high vapor rates.

Referring to FIGS. 4a, 4b, 4c, wherein like reference characters indicate like parts as above, the outlets 10a, 10b may be arranged in vertical pairs. This permits the distributor to sweep over a wide range of load states. In two stage distributors, it can be expedient if the liquid from the upper and lower row of openings 10a, 10b strike separate impact walls not shown) arranged next to each other to spread thereon.

Figure 5A:
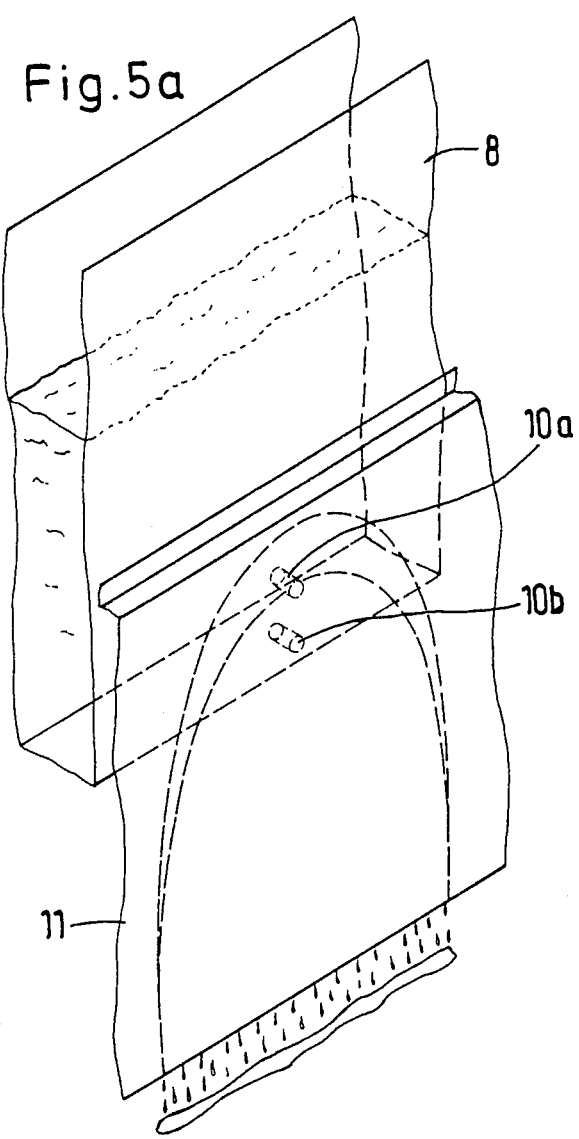
FIG. 5a illustrates a part-perspective view of a modified distributor employing pairs of outlet openings and a screening wall.

Referring to FIGS. 5a, 5b, and 5c, wherein like reference characters indicate like parts as above, a distributor may be constructed with an impact wall 9, a screening wall 11 and pairs of vertically arranged openings 10a, 10b.

Referring to FIGS. 6a and 6b, each impact wall 9 may be provided with a corrugated lower region having horizontally disposed corrugations in order to further laterally distribute the descending film of liquid uniformly across a column cross-section.

Referring to FIG. 7, the lower region of an impact wall 9 may be provided with a plurality of holes for lateral distribution of the liquid of the flowing film.

Referring to FIG. 8, each impact wall 9 may also be provided with a serrated lower edge 14 in order to permit better dripping of the liquid.

With the construction of the distributor described above, a good mechanism of action is achieved because spreading of the liquid on the impact wall even within a very large range of the inlet supply level of, for example, 50 to 200 millimeters (mm) changes surprisingly little as is evident from the following measurement data.

| Outlet hole diameter | = 6 millimeters (mm) |
|---|---|
| Impact wall distance | = 12 millimeters (mm) |
| Impact wall height | = fall (height) of liquid from hole to packing surface = 120 millimeter (mm) |
| Liquid Film width | = liquid strip length = b millimeters (mm) |
| Accumulation height in the side channel | = h millimeters (mm) |
| Test medium | = 98% ethanol |

| h (mm) | b (mm) |
|---|---|
| 50 | 132 |
| 80 | 152 |
| 120 | 160 |
| 160 | 166 |
| 200 | 180 |

It is apparent in the above measurement data that, at a reduction of the inlet supply level by the factor 4, the spreading area decreases only by 27%.

In an arrangement built according to the invention, the same degree of fineness of liquid distribution can be achieved with a number of liquid outlet openings smaller by orders of magnitude compared to conventional liquid distributors, for example box or pipe distributors. The liquid outlet openings can be correspondingly large so that an arrangement constructed according to the invention is considerably less sensitive to contaminations.

If the distributor is used together with an ordered packing, the distributor is best oriented so that the distributor channels, or arms, are arranged perpendicular to the main spreading direction of the packing layers below the distributor.

The number of distributor arms which can be tubular or channel-shaped, can —in comparison to the conventional liquid distributors—be considerably reduced. This enlarges the free vapor passage cross-section so that the pressure losses in the vapor phase are reduced.

Furthermore, the distributor can be manufactured corresponding to the particular applications in a simple manner of standard parts.

The invention thus provides a liquid distributor wherein the liquid expelled through the openings of the channel walls exits with high momentum and is to distributed under impact in a parabolic manner on the impact wall for subsequent delivery in a uniformly distributed manner to a packing below. The liquid distribution effects an extremely fine distribution of the liquid with a significantly small number of openings as compared to conventional liquid distributors having openings of relatively large diameter. Further, the liquid distributor is particularly insensitive to contamination.

The invention further provides a distributor which can be made of relatively simple parts and which can be retrofitted into existing structures.

The invention further provides a distributor which can be used with various types of exchange columns and with various types of packings whether of the ordered type or random or combinations thereof.

What is claimed is:

1. A distributor for distributing liquid in an exchange column comprising a plurality of distribution channels for receiving a liquid, each said channel having a pair of vertically disposed side walls;

a feeding device for feeding liquid to said distributors;

a plurality of orifices in a lower region of at least one side wall of a distribution channel adapted to expel streams of liquid laterally away from said side wall during normal operation; and a plurality of impact walls, each said impact wall having a flat uninterrupted portion spaced for impacting of a liquid stream thereon and formation of a downwardly flowing film on said impact wall, each said impact wall being spaced from a respective side wall a distance greater than the thickness of the film of liquid thereon.

2. A distributor as set forth in claim 1 wherein each orifice has a transverse dimension less than said distance between an impact wall and a respective side wall.

3. A distributor as set forth in claim 1 wherein each impact wall is secured along an upper edge to a respective side wall to prevent an upward flow of vapor therebetween.

4. A distributor as set forth in claim 1 which further comprises a plurality of screening walls, each said screening wall being connected at a lower end of a respective side wall of a distribution channel in depending relation and in parallel relation to an opposed impact wall.

5. A distributor as set forth in claim 4 wherein each screening wall and an opposed impact wall are connected along opposite vertical sides to prevent a lateral flow of vapor from therebetween.

6. A distributor as set forth in claim 1 wherein at least one impact wall has a plurality of holes in a lower region for lateral distribution of the liquid of said flowing film.

7. A liquid distributor for an exchange column comprising a plurality of parallel distribution channels, each said channel having a U-shaped cross-section for receiving a flow of liquid under gravity and a pair of vertical side walls, a plurality of orifices in a lower region of at least one side wall adapted to expel streams of liquid laterally away from said side wall during normal operation; and a plurality of flat uninterrupted impact walls, each said impact wall being spaced from a side wall of a respective distribution channel for impacting of a liquid stream thereon and formation of a downwardly flowing film on said impact wall, each said impact wall being spaced from a respective side wall a distance greater than the thickness of the film of liquid thereon and being secured along an upper edge to an intermediate portion of a respective side wall to prevent an upward flow of vapor therebetween.

8. A distributor as set forth in claim 7 wherein each opening is of circular shape with a diameter less than said distance between an impact wall and a respective side wall.

9. A distributor as set forth in claim 7 which further comprises a plurality of screening walls, each said screening wall being connected at a lower end of a respective side wall of a distribution channel in depending relation and in parallel relation to an opposed impact wall.

10. A distributor as set forth in claim 7 wherein said openings are disposed in vertical pairs in said one side wall.

11. A distributor as set forth in claim 7 wherein said impact wall has a corrugated lower region having horizontally disposed corrugations.

12. A distributor as set forth in claim 7 wherein said impact wall has a serrated lower edge for dripping of the liquid therefrom.

13. In combination
an exchange column;
at least one exchange packing disposed in and across said column; and
a liquid distributor above said packing for distributing a liquid thereto, said distributor having a plurality of parallel distribution channels, each said channel having a U-shaped cross-section for receiving a flow of liquid under gravity and a pair of vertical side walls, a plurality of openings in a lower region of at least one side wall of a distribution channel adapted to expel streams of liquid laterally away from said side wall during normal operation and a plurality of impact walls, each said impact wall having a flat uninterrupted portion spaced from a side wall of a respective distribution channel and extending downwardly beyond said respective distribution channel for impacting of a liquid stream thereon and formation of a downwardly flowing film on said impact wall, each said impact wall being spaced from a respective side wall a distance greater than the thickness of the film of liquid thereon.

14. The combination as set forth in claim 13 wherein each impact wall is secured along an upper edge to a respective side wall to prevent an upward flow of vapor therebetween.

15. The combination as set forth in claim 13 which further comprises a plurality of screening walls, each said screening wall being connected at a lower end of a respective side wall of a distribution channel in depending relation and in parallel relation to an opposed impact wall.

* * * * *

UNITED STATES PATENT AND TRADEMARK OFFICE
CERTIFICATE OF CORRECTION

PATENT NO. : 4,855,089

DATED : August 8, 1989

INVENTOR(S) : CHRISTOPH MICHELS

It is certified that error appears in the above-identified patent and that said Letters Patent is hereby corrected as shown below:

Column 7, line 22, "operation and" should be --operation; and--

Signed and Sealed this

Tenth Day of July, 1990

*Attest:*

HARRY F. MANBECK, JR.

*Attesting Officer*     *Commissioner of Patents and Trademarks*